No. 688,536. Patented Dec. 10, 1901.
W. G. MARR.
GAS ENGINE.
(Application filed Jan. 11, 1901.)
(No Model.) 2 Sheets—Sheet 2.

Witnesses.
Inventor:
William G. Marr
by Jas. H. Churchill
atty.

UNITED STATES PATENT OFFICE.

WILLIAM G. MARR, OF BOSTON, MASSACHUSETTS.

GAS-ENGINE.

SPECIFICATION forming part of Letters Patent No. 688,536, dated December 10, 1901.

Application filed January 11, 1901. Serial No. 42,858. (No model.)

*To all whom it may concern:*

Be it known that I, WILLIAM G. MARR, a citizen of the United States, residing in Boston, in the county of Suffolk and State of Massachusetts, have invented an Improvement in Gas-Engines, of which the following description, in connection with the accompanying drawings, is a specification, like letters on the drawings representing like parts.

This invention relates to a gas-engine, especially adapted, among other uses, to be employed on automobiles. The invention has for its object to provide a gas-engine which is simple, substantially free from vibration, economical, and efficient in operation. For this purpose I employ a cylinder movable in a casing, a piston movable in said cylinder, mechanism for connecting said cylinder and piston with cranks on opposite sides of a main shaft, so that the said cylinder and piston are moved in opposite directions, a gas-supply adapted to communicate with the said cylinder, a source of air under pressure adapted to communicate with the said cylinder, and means for igniting the mixture of air and gas compressed between said cylinder and piston, as will be described. These and other features of this invention will be pointed out in the claims at the end of this specification.

Figure 1:
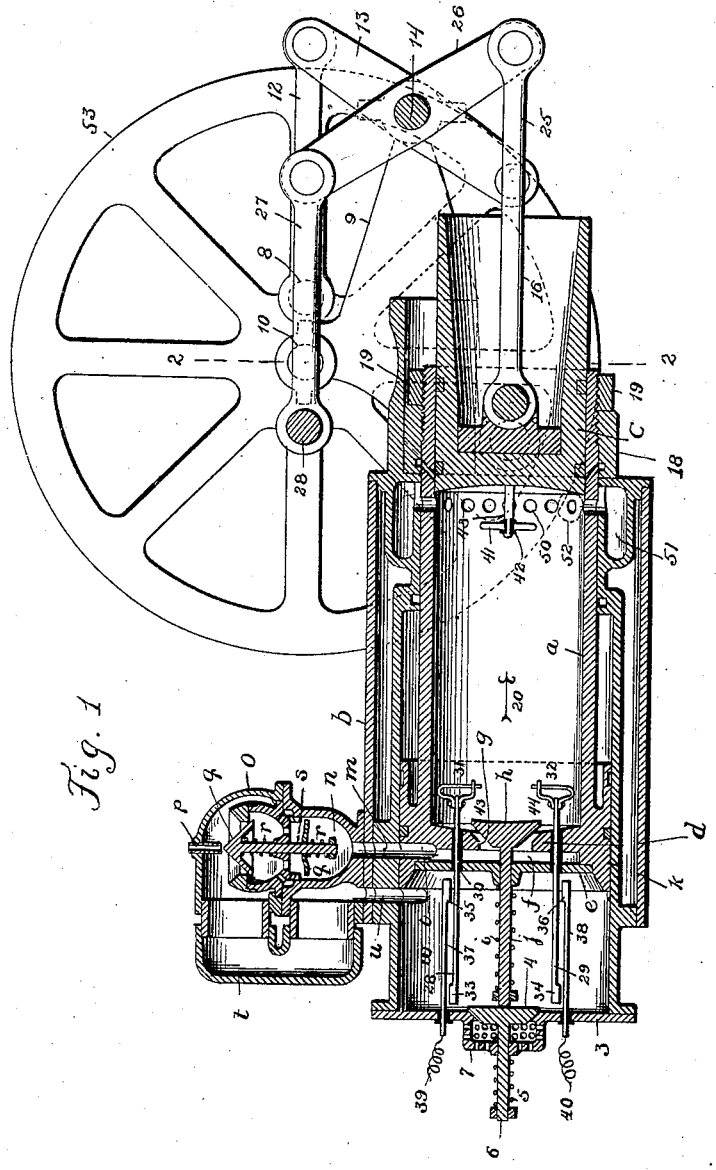
Figure 2:
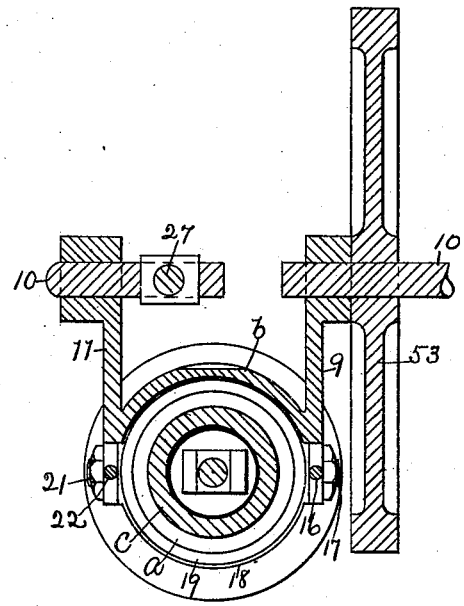

Figure 1 represents in section and elevation a gas-engine embodying this invention, and Fig. 2 a cross-section on the line 2 2, Fig. 1.

In the embodiment of the invention herein shown, $a$ represents a cylinder, which is movable in a stationary casing $b$, and in which cylinder moves a piston $c$, the said cylinder and piston being moved in opposite directions, as will be described. The cylinder $a$ may be made as herein shown and is provided with a double head $d\,e$, forming a chamber or space $f$ between them, the head $d$ having a port or opening $g$, with which coöperates a valve $h$ which is adapted to be seated by a spring $i$, encircling the rod $j$ of said valve. The cylinder $a$ is provided at its rear end with an annular collar or enlargement $k$, which forms a bearing-surface for the rear end of said cylinder, and the said collar or enlargement is provided with a port or passage $l$, which communicates with the chamber or space $f$ and also coöperates with a gas-admission port or passage $m$, which extends through the stationary casing $b$ and in the present instance communicates with a chamber $n$ in a vaporizor $o$. The vaporizor $o$ is provided with a vapor-inlet tube $p$, extended outside of the vaporizer and connected with a suitable source of supply, and between said inlet-tube and the port $m$ are interposed one or more valves $q$, herein shown as two in number, which are adapted to be seated by springs $r$ on the stem or rod $s$. The vaporizor $o$ is provided with an air-chamber $t$, which communicates through a port $u$ with a chamber $w$ in the stationary casing, the head of the movable cylinder forming one wall of the chamber $w$. The chamber $w$ is adapted to communicate with the atmosphere through a port in the head 3 of the casing $b$, which port is controlled by a valve 4, normally closed by a spring 5 on the valve stem or rod 6, which, as shown, is supported by a perforated cap 7, attached to or forming part of the stationary casing.

The valve 4 is opened by the movement of the cylinder $a$ in the direction indicated by the arrow 20, which movement is communicated to the main shaft 10 in the present instance by a crank 8 on said shaft, which has its bearings in brackets or arms 9 11, attached to the stationary casing $b$ on opposite sides of the same, as shown in Fig. 2, the said crank being connected by a link or rod 12 to a rocker-arm 13, fast on a shaft 14, mounted in suitable bearings in arms or brackets 9 11. The rocker-arm 13 is connected by the link or rod 16 to one side of the movable cylinder $a$, and in the present instance the said rod is connected to a stud 17, projecting from a collar or band 18, secured onto the front end of the cylinder, which may be screwed onto said cylinder, as represented in Fig. 1, and locked thereon by a nut 19. The band or collar 18 is provided on the opposite side of the cylinder with a like stud 21, (see Fig. 2,) which is connected by a rod or link 22 with a rocker-arm (not herein shown) which is keyed to the shaft 14 and works in unison with the rocker-arm 13.

The piston $c$ is connected by a link or rod 25 to a rocker-arm 26, which is loose on the shaft 14 and has its upper end joined by the link or rod 27 to a crank 28 on the opposite side of the shaft 10.

The movement of the cylinder and piston in opposite directions is effected by the explosion of a gaseous mixture in the cylinder, and the explosion may be effected, as herein shown, by an electric igniter comprising two members, one of which is carried by the cylinder and the other of which is carried by the piston. The member of the igniter which is carried by the cylinder may be made as herein shown and comprises metal rods 28 29, extended through bushings 30, of insulating material, carried by the head of the cylinder, the said rods having within the cylinder bent spring-fingers 31 32 and being provided outside the cylinder with lugs or projections 33 34, which are adapted to be brought into sliding engagement with like lugs or projections 35 36 on conducting-rods 37 38, to which the circuit-wires 39 40 are connected. The member carried by the piston $c$ comprises a bridge-piece or cross-bar 41, carried by a sleeve 42, of insulating material, fixed on a stud or rod 143, attached to the piston. The members of the igniter are arranged with relation to each other so that on the movement of the cylinder and piston toward each other the bridge-piece 41 will pass by or between the spring-fingers 31 32 after the lugs 33 34 engage their coöperating lugs 35 36; but the circuit thus established will not be broken until the piston and cylinder commence to move away from each other, whereupon the bridge will pass by the spring-fingers and form a spark which will ignite the compressed charge of gas. The two parts of the member carried by the cylinder are constructed as shown, so that when the bridge-piece has passed between the spring-fingers on the inward movement of the piston and cylinder the said bridge will remain in contact with arms 43 44, fastened to or forming part of the rods 28 29, and thus avoid the formation of a spark on the inward movement of the cylinder and piston. The arms 43 44 are forked to receive the end of the spring-fingers, and on the inward movement of the cylinder and piston the curved ends of the bridge-piece 41 force the spring-fingers laterally until the bridge has passed by said fingers, whereupon they are restored to their normal position shown and ready to be engaged by the opposite side of the bridge, which pulls the fingers outward between the forked ends of the arms 43 44 until the bridge passes out of engagement with the spring-fingers, whereupon they spring back against the rear wall of the forked ends of the said arms, thus breaking the circuit and creating a spark, which ignites the charge in the cylinder. In the position shown in Fig. 1 the engine or motor is on its outward center and is taking gas from the vaporizer and exhausting the spent or consumed gases through the ports 50, which communicate, as shown, with an annular chamber or passage 51 in the stationary casing, which passage is provided with an outlet-port 52. (Indicated by dotted lines, Fig. 1.) The momentum of the fly-wheel 53 carries the parts over the dead-center and moves the cylinder $a$ in the direction indicated by arrow 20 and at the same time moves the piston $c$ in the opposite direction. The movement of the cylinder $a$ cuts off the communication between the vaporizer and the said cylinder, thus shutting off the supply of gas, and the movement of the cylinder and piston closes the exhaust-ports 50, thus confining within the cylinder an explosive mixture which is compressed between the cylinder-head and the piston. At the inner center the igniter-circuit is completed, as described, and the momentum of the fly-wheel carries the engine over the center and the cylinder and piston commence their movement away from each other. At the beginning of this latter movement the igniter-circuit is broken and a spark created which ignites the compressed mixture of gas and air, thus causing an explosion, which drives the piston and cylinder to the end of their outward strokes and into the position shown in Fig. 1. On the inward movement of the cylinder $a$ in the direction indicated by arrow 20 fresh air is drawn into the chamber $w$, which also fills the air-chamber $t$ of the vaporizer, the valves $q$ at such time being closed, and on said inward movement of the cylinder the valve $h$ is closed, thus completing the surface of the head $d$ for the exploded gases to act against. On the return or outward movement of the cylinder in the direction opposite to that indicated by arrow 20 the air in the chamber $w$ is compressed, and when the port $l$ in the cylinder comes in line with the outlet-port $m$ for the vaporizer the compressed air opens the valves $q$ and passes into the cylinder, the said air on its passage by the vapor-inlet $p$ carrying with it a supply of vapor sufficient to operate the engine.

It will be noticed that the explosive force is directed against two movable bodies. Consequently the vibration of the engine or motor is reduced to a minimum. The engine is simple, economical, and highly efficient, the efficiency being increased by the reduction in friction due to the piston being joined to the rocker-arm by a connecting-rod $w$ hich moves in a substantially straight line, which latter construction enables the recoil from the explosion to be applied to the rocker-arm or crank rather than to the main shaft.

I claim—

1. In an engine of the class described, the combination with a movable cylinder, of a piston movable in said cylinder in a direction opposite to that in which the cylinder is moved, a main shaft, rocker-arms connected to cranks on opposite sides of said main shaft, and means for connecting the said rocker-arms with the said cylinder and piston, for the purpose specified.

2. In an engine of the class described, the combination with a movable cylinder provided with a double head forming a chamber between them, of a piston movable in said cylinder in a direction opposite to that in which said cylinder is moved, a gas-supply adapted to communicate with the chamber between the double head of the cylinder, and means for igniting the gas compressed in said cylinder by the movement of said cylinder and piston toward each other, substantially as described.

3. In an engine of the class described, the combination with a casing provided with a port or opening, an air-admission valve coöperating with said port, a cylinder movable in said casing and coöperating therewith to form an air-compression chamber, a piston movable in said cylinder in a direction opposite to that in which the cylinder is moved, a vaporizer communicating with said air-compression chamber and with said cylinder when the latter is at or near the end of its stroke away from said piston, whereby air drawn into said compression-chamber on the movement of the cylinder in one direction is forced into the vaporizer on the movement of said cylinder in the opposite direction and passes into said cylinder when the latter reaches substantially the end of its movement away from said piston, means for igniting the vaporized air when said mixture has been compressed by the movement of the cylinder and piston toward each other, and an exhaust from said cylinder of the exploded mixture, substantially as described.

4. In an engine of the class described, the combination with a casing provided with a head, a cylinder movable therein and coöperating therewith to form a compression-chamber, a piston movable in said cylinder in a direction opposite to that in which the cylinder is moved, means to move said cylinder and piston, means to connect said compression-chamber with said cylinder when the latter reaches substantially the end of its movement away from said piston, means for igniting an explosive charge in said cylinder when said charge has been compressed by the movement of the cylinder and piston toward each other, and an exhaust from said cylinder, substantially as described.

In testimony whereof I have signed my name to this specification in the presence of two subscribing witnesses.

WILLIAM G. MARR.

Witnesses:
JAS. H. CHURCHILL,
J. MURPHY.